United States Patent [19]

Van Riemsdijk et al.

[11] 4,107,672
[45] Aug. 15, 1978

[54] APPARATUS AND METHOD FOR DETECTING CRACKS IN THE HEAT-INSULATING LINING OF A CONTAINER FOR COLD LIQUIDS

[75] Inventors: Arnoldus J. Van Riemsdijk; Willem P. Hendal, both of Amsterdam, Netherlands

[73] Assignee: Shell Internationale Research Maatschappij B.V., The Hague, Netherlands

[21] Appl. No.: 649,562

[22] Filed: Jan. 15, 1976

[30] Foreign Application Priority Data

Jan. 22, 1975 [NL] Netherlands ............... 00739/75

[51] Int. Cl.² .................................... G08B 13/21
[52] U.S. Cl. ............................... 340/605; 62/129; 114/74 A; 137/551; 220/901; 340/652
[58] Field of Search ............... 340/256, 421, 274 R; 137/797, 551, 68 R; 206/0.6; 220/9 LG, 9 F, 9 M; 62/45, 129; 114/74 A

[56] References Cited

U.S. PATENT DOCUMENTS

| | | | |
|---|---|---|---|
| 3,411,656 | 11/1968 | Jackson | 114/74 A |
| 3,655,086 | 4/1972 | Trenner | 220/9 LG |
| 3,757,982 | 9/1973 | Isenberg et al. | 220/436 |
| 3,825,920 | 7/1974 | Nelson et al. | 340/274 R |
| 3,914,688 | 10/1975 | Lev | 324/71 R |
| 3,952,295 | 4/1976 | Luisada et al. | 340/274 R |

FOREIGN PATENT DOCUMENTS

| | | |
|---|---|---|
| 1,436,001 | 3/1966 | France. |
| 7,402,919 | 9/1974 | Netherlands. |

Primary Examiner—Glen R. Swann, III
Attorney, Agent, or Firm—Pravel, Wilson & Gambrell

[57] ABSTRACT

A new and improved apparatus for detecting cracks in the heat-insulating liner of a container for cold liquids, wherein a plurality of breakable or frangible electrical conductors and a barrier means having a woven mat of glass-fiber material are incorporated in the heat-insulating material and detector means is connected with the electrical conductors to detect breaks in the electrical conductors caused by cracks in the heat-insulating material attaining a critical length. The frangible electrical conductors may be frangible wires or stripes of conducting paint.

32 Claims, 5 Drawing Figures

APPARATUS AND METHOD FOR DETECTING CRACKS IN THE HEAT-INSULATING LINING OF A CONTAINER FOR COLD LIQUIDS

BACKGROUND OF THE INVENTION

The invention relates to a heat-insulated container for the storage or transport of cold liquids, such as liquefied gases, comprising a rigid wall and a heat-insulating lining of a rigid foam material, preferably of polyurethane foam, arranged on the rigid wall and more in particular to means and a method for detecting cracks in the heat-insulating lining of this container.

Such a container is adapted for use, respectively as a land storage tank or as a ship's tank, respectively for storage or transport of liquefied gases, such as, for example, liquefied natural gas, liquefied methane, liquefied propane or liquefied butane.

Liquefied natural gas is stored or transported in such a container at a temperature of about −160° C. When a rigid wall of the container is normal steel and the heat-insulating lining is arranged on the inner surface of the rigid wall, the danger exists that, in case of failure of the lining, the steel wall will cool down to such a degree that it would become brittle and lose its strength.

Since the heat-insulating lining is applied at a temperature different from its temperature in use, cracks can develop in the lining as a result of changes in temperature. It is also possible for hairline cracks in the rigid wall to start a crack in the lining since the lining is generally bonded to the rigid wall.

It has already been proposed to arrange a barrier in the heat-insulating lining to act as a crack arrester (see U.S. patent application Ser. No. 523,641, filed Nov. 14, 1974, now abandoned). Preferably this barrier consists of a combination of woven glass-fibre material and an epoxy resin. It is possible to locate the barrier in such a manner that an incipient crack in the lining is arrested before it attains its "critical crack length".

By the term "critical crack length" is understood the maximum length a crack can attain before its length increases in an unstable manner.

Several leak detection systems based on the change in temperature of the heat-insulating lining as a result of the penetration of liquid into cracks in the lining, have been proposed already, such as for example a system in which thermocouples are used.

A drawback of these known leak detection systems is that they involve a delay in response; a crack that has attained the critical length can be so narrow that little or none of the cold liquid penetrates the lining although a critical situation has arisen and a warning should be given. It is also possible for the penetrating liquid to boil and produce so much vapour that the crack becomes thermally insulated and that there is too little cooling to trigger the alarm. The use of thermocouples, for example, is moreover limited to measurements in the vicinity of the individual thermocouples. In view of the large dimensions of the containers in practice, this means that a large number of thermocouples is needed. The distance between a crack and the nearest thermocouple acts as a delaying factor. It is also difficult to obtain a selective detection of cracks of critical length and to avoid triggering of the alarm in the case of cracks of smaller length.

SUMMARY OF THE INVENTION

The present invention provides means and a method for detecting cracks overcoming these drawbacks and capable of providing the required degree of selectivity.

For this purpose the above mentioned container comprises, according to the invention, a plurality of electrical conductors which are incorporated in the heat-insulating lining, wherein the electrical conductors are connected to electrical equipment adapted for detecting breakage of an electrical conductor.

In a suitable embodiment of the invention, a barrier is incorporated in the heat-insulating lining and the electrical conductors are arranged in, or adjacent to, the barrier.

In this way a system is obtained whereby strict selectivity in the detection of cracks is possible. As long as cracks occur which are arrested by a barrier, there will be no alarm. And provided this barrier is correctly located, an alarm is not required. However, as soon as a crack penetrates a barrier, involving actual cracking of the latter, one or more of the conductors will break and trigger the alarm. The crack has then exceeded the critical length, assuming that the barrier is correctly located, so that there is a potential danger. Safety precautions can then be taken until the cold liquid is removed from the space and repair-work can be carried out. The conductors and the barrier can be restored when the repair-work is carried out so that full crack-detection is retained in the future.

Preferably the said electrical conductors form a network in such a manner that the electrical conductors cross each other. This embodiment enables a proper location of any dangerous cracks which might be present in the heat-insulating lining.

The method of detecting cracks in the heat-insulating lining of the container according to the invention comprises checking the electrical resistance of the various electrical conductors. In this manner breakage of one or more of the electrical conductors can easily be detected by the presence of a substantial increase of the electrical resistance of any electrical conductors which have broken. By identifying the electrical conductors which have broken, it is then possible to locate the presence of dangerous cracks in the lining.

BRIEF DESCRIPTION OF THE DRAWINGS

This invention will now be explained with reference to the drawings, wherein.

DESCRIPTION OF THE PREFERRED EMBODIMENT

Figure 1:
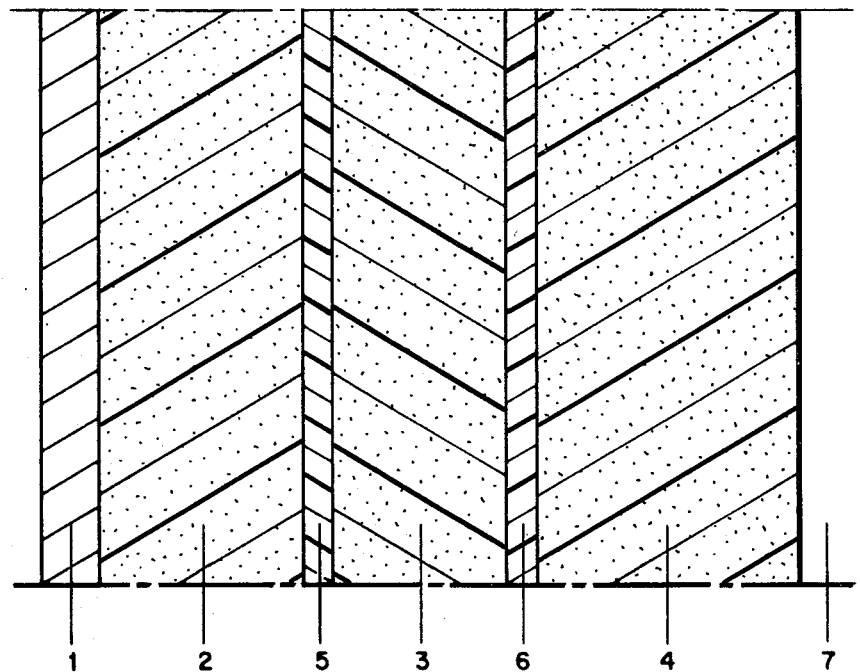
FIG. 1 is a diagrammatic cross-section of a part of a rigid wall provided with a heat-insulating lining of a container for storing cold liquids, wherein a barrier is incorporated in the heat-insulating lining.

In FIG. 1 a rigid wall 1, which is for example the steel hull of a tanker having a single hull or the steel inner hull of a tanker having a double hull, is provided with a heat-insulating lining comprising three successive layers 2, 3 and 4 of rigid foam material, preferably polyurethane foam, interspersed with barriers 5 and 6. In this manner the rigid wall 1 is insulated from the cold liquid 7 stored in the container.

The rigid foam material is preferably a rigid polyurethane foam with closed cells. Layers 2, 3 and 4 are preferably applied by spraying. The outer surface of layer 2 is bonded to the rigid wall 1. The inner surface of layer 4 is normally in direct contact with the cold liquefied gas present in the container.

Figure 2:
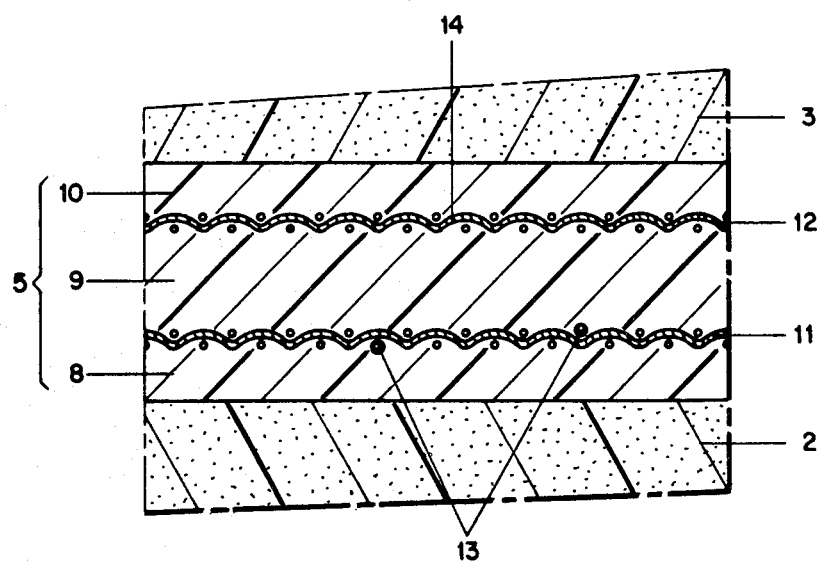
FIG. 2 is a cross-section on an enlarged scale of a fragment of one of the barriers according to FIG. 1, wherein the barrier is provided with electrical conductors according to the invention.

As seen in FIG. 2, barriers 5 and 6 each comprise two woven mats 11 and 12 of glass-fibre material embedded a certain distance apart in layers 8, 9 and 10 of epoxy resin.

In FIG. 2 is shown a cross-section of barrier 5 turned through 90°. Barrier 5 comprises two outer layers, 8 and 10, of epoxy resin which are bonded to layers 2 and 3 of polyurethane foam, and a middle layer 9 of epoxy resin.

The woven mats 11 and 12 are made of glass-fibre material consisting of warp and weft threads. In mat 11 breakable or frangible copper wires 13 are woven in a direction perpendicular to the section and in mat 12 similar copper wires are woven in a direction parallel to the section. These latter wires are not visible in the section shown but run parallel with glass-fibre thread 14.

The above-mentioned copper wires form the electrical conductors according to the invention. On each wall of the container which is for example prismatic, the sets of copper wires can be interconnected along two of the edges of the container wall and linked along a common path to the electrical detection equipment. On the other two edges each wire, adequately insulated from the next, must be separately connected to the detection equipment. To reduce the number of connections on this equipment, it is also possible to connect the wires of one wall to their counterparts of an adjacent wall. This must naturally be done in such a manner that correct location of a breakage in a wire remains possible, for example, by linking "criss-cross" wires with separate detectors.

As long as cracks occur in the heat-insulating lining 2, 3, 4 which are arrested by a barrier 5 or 6, there will be no alarm. And provided said barrier is correctly located, an alarm is not required. However, as soon as a crack penetrates a barrier, involving actual cracking of the latter, one or more of the electrical conductors will break and trigger the alarm. The crack has then exceeded the critical length, assuming that the barrier is correctly located, so that there is a potential danger. Safety precautions can then be taken until the cold liquid is removed from the container and repair-work can be carried out.

The electrical conductors do not need to be mechanically stronger than the barrier and may even be weaker. Breakage of an electrical conductor can be detected by connecting it to a source of electric power and determining that the electrical resistance of the conductor has increased very considerably. For this purpose, the two ends of each electrical conductor can be connected to the detection equipment. It is also possible to connect only one end of the electrical conductors to the equipment via switches whilst the other ends of all the conductors or groups of conductors are connected to the equipment along a common path, for example via the steel wall of the container.

Equipment for detecting the breakage of individual electrical conductors can for example incorporate a "scanner" to check the electrical resistance of the various electrical conductors in rapid sequence. This can be done for example by using a roller switch comprising stator and rotor and having a switch for each electrical conductor, the switches being closed in sequence as the rotor turns. In this way the electrical conductors can be connected in sequence to a device adapted for measuring the electrical resistance of each electrical conductor. To indicate a break of an electrical conductor, one can for example arrange for the electrical power supply to the rotor drive of such a roller switch to be interrupted by the measuring device as soon as an excessive electrical resistance is measured. The position of the rotor will then indicate which electrical conductor has broken. Scanners of this kind are well known and are available on the market in various embodiments.

Preferably the electrical conductors form a network of criss-cross wires. Such a network, in which two sets of wires run at an angle of 90° to each other, has the advantage that a crack occurring in the barrier can be exactly located by reference to the particular wires that have failed in each of the two sets, the crack having occurred at, or close to, the location at which the said wires cross each other.

By the term "criss-cross" wires is meant that the sets of wires lie in parallel planes and do not touch each other so that breakage will cause a really sudden change in electrical resistance.

It is noted that in certain application, particularly in those cases in which the stored cold liquid is not at an unduly low temperature, such as for example liquefied propane or butane, the presence of a barrier in the heat-insulating lining is not absolutely essential. In such cases the outer portion of the heat-insulating lining itself functions as a kind of barrier, since the temperature of this portion of the lining is high enough to avert the danger of a brittle fracture. An incipient crack in the heat-insulating lining will be arrested by the outer portion of the heat-insulating lining before it has attained a critical length. If, nevertheless, it is desired to receive a warning in such cases, if a crack occurs, electrical conductors can be incorporated in the manner according to the invention, for example, at the boundary between the relatively cold and relatively hot part of the heat-insulating lining.

The electrical conductors preferably consist of a metal that does not become unduly brittle at low temperature, such as a copper or aluminum alloy. It will be clear that the cooling to which the electrical conductors will be subjected under normal operating conditions must not cause them to contract so much that they break. To this end, use may be made of alloys with low coefficients of expansion. The electrical conductors must also possess sufficient elasticity to accommodate any deformation of the heat-insulating lining. With this end in view, copper alloys are very suitable indeed.

If desired, the electrical conductors may be formed by stripes of conducting paint applied on one or more interfaces of the heat-insulating lining and a barrier and linked to the said detecting equipment via electrodes. Under certain conditions stripes of paint may present advantages as compared with wires. The stripes can be brushed on at an intermediate stage during the application of the heat-insulating lining, for example immediately before the application of a barrier.

In the embodiment of the invention as described and as shown in the drawings, the heat-insulating lining is arranged on the inner surface of the rigid wall of the container. Instead it is possible to apply the invention to a heat-insulating lining which is arranged on the outer surface of the rigid wall of the container.

Figure 3:
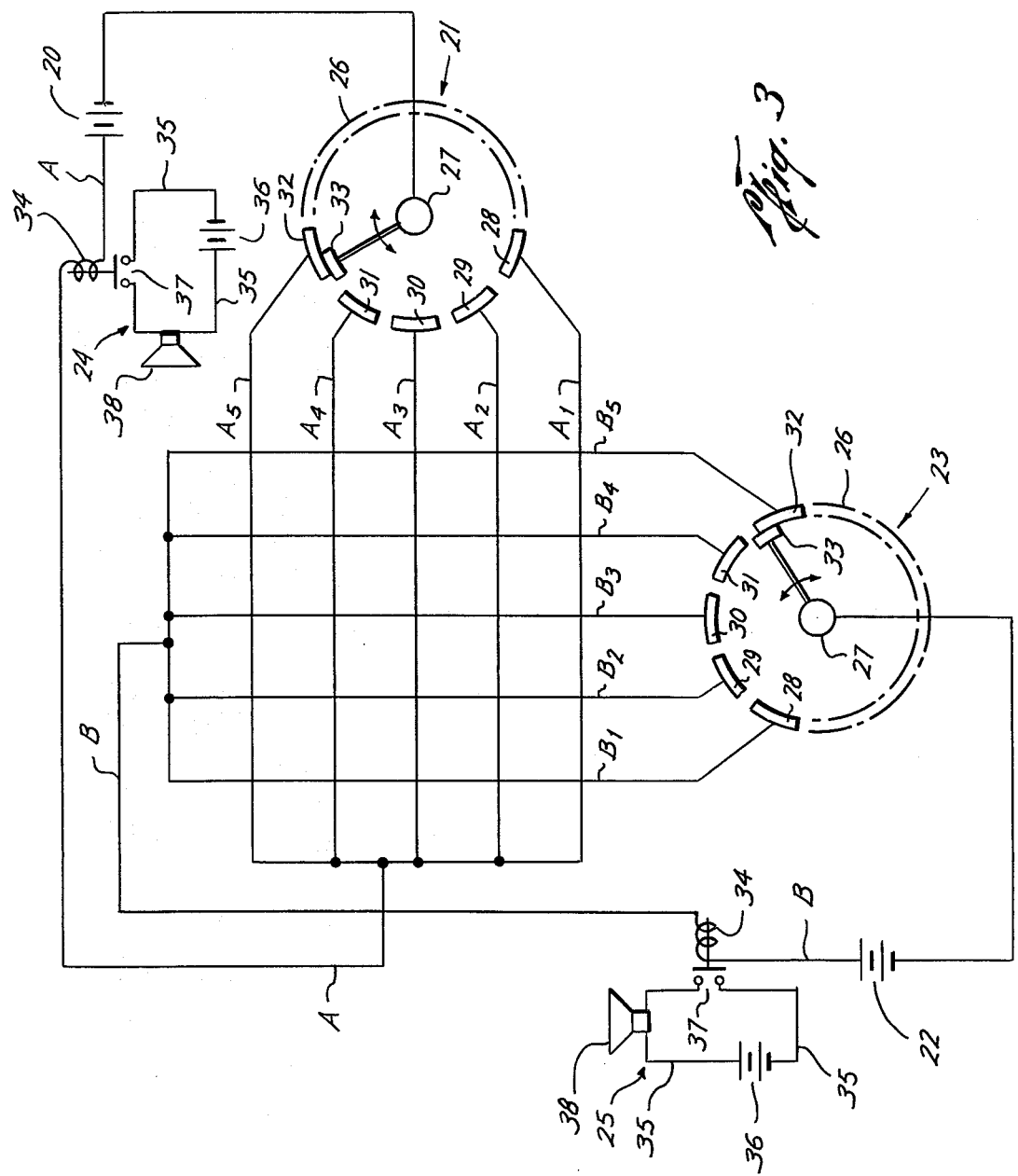
FIG. 3 is a schematic view illustrating one type of electrical arrangement with scanners.

FIG. 3 shows schematically a suitable arrangement of the electrical conductors along a wall of a heat-insulated tank. At one side the electrical conductors $A_1$, $A_2$, $A_3$, $A_4$ and $A_5$ are connected to an electrical conductor A, which conductor is connected to electric power 20. The electrical conductors $A_1 - A_5$ are connected to the other pole of the electric power 20 via a conventional scanner 21.

Electrical conductors $B_1$, $B_2$, $B_3$, $B_4$, and $B_5$ criss-cross the electrical conductors $A_1 - A_5$, and are connected to a source of electric power 22 via an electrical conductor B. The conductors $B_1-B_5$ are connected to the other pole of electric power 22 via a conventional scanner 23.

The electric circuits obtained in this manner are provided with detector means 24 and 25 adapted to indicate an interruption of the electric current in conductor A or B and therefore indicating a breakage of one of the electric conductors $A_1-A_5$ or $B_1-B_5$. By using such scanners, it is possible to detect which electric conductor is eventually broken. As illustrated, each of the scanners 21 and 23 comprises a stator 26 and a rotor 27 and the electric conductors $A_1-A_5$, $B_1-B_5$ are each connected to corresponding contacting elements 28, 29, 30, 31 and 32, which elements form part of the stator 26. The rotor 27 is provided with a contacting element 33, mating the contacting elements 28 to 32 in sequence when the rotor 27 is operated. In this way, the electrical conductors $A_1-A_5$ and $B_1-B_5$ are connected in sequence to the detector means 24 and 25, respectively. In case of breakage of a conductor $A_1-A_5$ or a conductor $B_1-B_5$, the position of the rotor 27 will then indicate which electrical conductor has broken.

Scanners of the type illustrated and described above are well known and are available on the market in various embodiments.

Each of the detector means 24 and 25 comprises a relay 34, an electric circuit 35, a source of electric power 36, a switch 27 adapted to be operated by the relay 34 and a warning device 38 (for example optical or acoustical). When an electrical conductor $A_1-A_5$ or $B_1-B_5$ has broken, the flow of electric current through the relevant conductor and therefore through the electrical conductor A or B will be interrupted, which causes the relay 34 to operate the switch 37 so that the electric circuit 35 will be closed. This causes the warning device 38 to start operation so that personnel will be warned about the existence of a failure of the heat-insulating material and its location.

Figure 4:
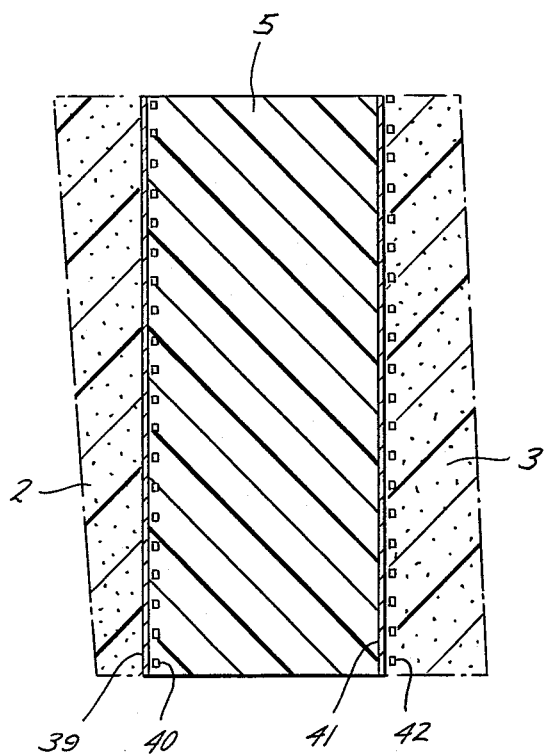
FIG. 4 is a cross-sectional fragmentary view of the rigid wall of FIG. 1.

FIG. 4 shows a cross-section on an enlarged scale of a fragment of a rigid wall according to FIG. 1. In this embodiment the heat-insulating layer 2 is provided with spaced apart criss-crossing stripes of conducting paint 39 and 40. Preferably, at the inner side the barrier 5 is also provided with spaced apart criss-crossing stripes of conducting paint 41 and 42. In this manner defects in the heat-insulating layer 3 and in the barrier 5 can be revealed by the use of the stripes of conducting paint.

Figure 5:
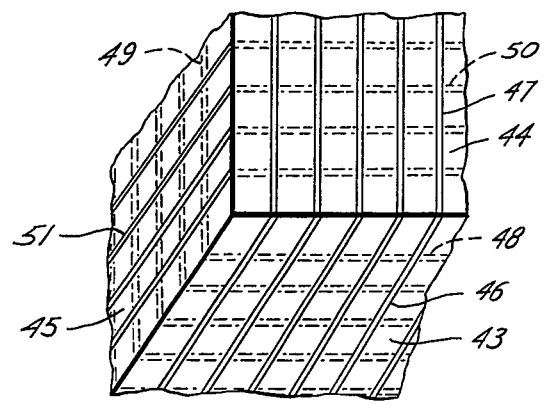
FIG. 5 is a fragmentary isometric view of a prismatic container having criss-crossing conductors on three walls.

FIG. 5 shows schematically a fragment of a prismatic container comprising the walls 43, 44 and 45. The heat-insulating material of these walls is provided with a network of electric conductors according to the invention. To reduce the number of connections required for making the connection to the detector means, as explained in connection with FIG. 3, the electric conductors 46 of wall 43 are connected to the conductors 47 of wall 44. In the same manner conductors 48 and 50 of walls 43 and 44, respectively, are connected to the conductors 49 and 51, respectively, of wall 45.

The foregoing disclosure and description of the invention are illustrative and explanatory thereof, and various changes in the size, shape and materials as well as in the details of the illustrated construction may be made without departing from the spirit of the invention.

We claim:

1. A heat-insulated container apparatus for storage or transport of cold liquids having a rigid wall structure with a lining of heat-insulating material on the interior surface wall structure, wherein the improvement comprises:
   frangible electrical conductor means incorporated in the heat-insulating material; and
   detector means linked with the conductor means to detect breakage in the electrical conductor means caused by cracks in the heat-insulating material attaining a critical length.

2. The apparatus as set forth in claim 1, wherein:
   a barrier layer with increased strength relative to the heat-insulating lining which acts as a crack arrestor is incorporated in the heat-insulating material along with the frangible electrical conductor means.

3. The apparatus as set forth in claim 2, wherein:
   the barrier layer comprises a woven mat of glass-fibre material.

4. The apparatus as set forth in claim 3, wherein:
   the glass-fibre material has warp and weft threads.

5. The apparatus as set forth in claim 3, wherein:
   the frangible electrical conductor means comprises a plurality of electrical conductor wires woven into the mat of glass-fibre materials.

6. The apparatus as set forth in claim 3, wherein:
   the frangible electrical conductor means comprises frangible stripes of conducting paint applied to the heat-insulating material adjacent the barrier layer.

7. The apparatus as set forth in claim 2, wherein:
   the barrier layer comprises at least one layer of epoxy resin.

8. The apparatus as set forth in claim 1, wherein:
   the frangible electrical conductor means comprises a plurality of frangible electrical conductor wires incorporated in the heat-insulating material.

9. The apparatus as set forth in claim 8, wherein:
   the rigid wall structure is prismatic; and
   the conductor wires of one wall are connected to their counterpart wires of an adjacent wall to reduce the number of connections required to the detector means.

10. The apparatus as set forth in claim 9 wherein:
    the electrical conductor wires criss-cross each other at selected locations; and
    the criss-cross wires are linked with separate detectors to allow locating a break in either of the criss-cross wires.

11. The apparatus as set forth in claim 1, wherein:
    the electrical conductor means extends parallel to the rigid wall structure of the container.

12. The apparatus as set forth in claim 1, wherein:
the electrical conductor means comprises first electrical conductors extending parallel to the rigid wall structure; and
the electrical conductor means comprising second electrical conductors extending parallel to the rigid wall structure and crossing the first electrical conductors.

13. The apparatus as set forth in claim 1, wherein:
the frangible electrical conductor means consist of frangible stripes of conducting paint applied to the heat-insulating material.

14. The apparatus as set forth in claim 13, wherein:
a barrier layer in the lining with increased strength acting as a crack arrestor is incorporated in the heat-insulating material; and
the frangible electrical conductor means comprises frangible stripes of conducting paint on one or more interfaces of the heat-insulating liner and a barrier and linked to the detector means.

15. A method for detecting cracks in the heat-insulating material of a heat-insulating container apparatus for storage or transport of cold liquids having a rigid wall structure with a lining of heat-insulating material on the interior surface of the wall structure, wherein the improvement comprises:
incorporating frangible electrical conductor means in the heat-insulating material; and
detecting breakage in the electrical conductor means caused by cracks in the heat-insulating material attaining a critical length.

16. The method as set forth in claim 15, including:
incorporating a barrier layer in the lining with increased strength acting as a crack arrestor in the heat-insulating material along with the frangible electrical conductor means.

17. The method as set forth in claim 16, wherein:
the step of incorporating a barrier layer includes incorporating a woven mat of glass-fibre material.

18. The method as set forth in claim 17, including:
the step of weaving a plurality of electrical conductor wires into the mat of glass-fibre materials.

19. The method as set forth in claim 17, wherein:
the step of incorporating the frangible electrical conductor means includes applying frangible stripes of conducting paint to the heat-insulating material adjacent the barrier means.

20. The method as set forth in claim 16, wherein:
the step of incorporating the barrier layer includes incorporating at least one layer of epoxy resin as part of the barrier layer.

21. The method as set forth in claim 15, wherein:
the step of incorporating frangible electrical conductor means includes incorporating a plurality of frangible electrical conductor wires in the heat-insulating material.

22. The method as set forth in claim 21, including:
forming the rigid wall structure with a prismatic surface; and
connecting the conductor wires in one wall to their counterpart wires of an adjacent wall to reduce the number of connections required to detect breakage.

23. The method as set forth in claim 22, wherein:
the step of incorporating the plurality of frangible electrical conductor wires includes criss-crossing the electrical conductor wires at selected locations; and
linking the criss-cross wires with separate detectors to allow locating a break in either of the criss-cross wires.

24. The method as set forth in claim 15, wherein:
the step of incorporating the frangible electrical conductor means includes extending the conductor means parallel to the rigid wall structure of the container.

25. The method as set forth in claim 15, wherein:
the step of incorporating the frangible electrical conductor means includes incorporating first electrical conductors extending parallel to the rigid wall structure; and
incorporating second electrical conductors extending parallel to the rigid wall structure and crossing the first electrical conductors.

26. The method as set forth in claim 15, wherein:
the step of incorporating the frangible electrical conductor means includes applying frangible stripes of conducting paint to the heat-insulating material.

27. The method as set forth in claim 26, including:
incorporating a barrier layer to act as a crack arrestor in the heat-insulating material; and
forming the frangible electrical conductor means by applying frangible stripes of conducting paint on one or more interfaces of the heat-insulating liner and barrier.

28. A method of detecting cracks in the heat-insulating material of a heat-insulating container apparatus for storage or transport of cold liquids having a rigid wall structure with a layer of insulating material on the interior surface of the wall structure and frangible electrical conductor means in the heat-insulating material, comprising:
detecting breaks in the conductor means caused by cracks in the heat-insulating material attaining a critical length; and
triggering an alarm to indicate that there is a potential danger.

29. The method as set forth in claim 28, wherein said step of detecting breaks in the conductor means comprises
connecting the electrical conductor means to a source of electrical power and determining that the electrical resistance has increased considerably due to breakage of the frangible electrical conductor means.

30. The method as set forth in claim 28, wherein:
the electrical conductor means has individual conductors and the step of detecting breaks in the conductor means includes detecting breakage of the individual electrical conductors with a scanner to check the electrical resistance of the various electrical conductors in rapid sequence.

31. The method as set forth in claim 28, wherein:
the electrical conductor means has a network of criss-cross wires with two sets of wires running at an angle of 90° to each other and the step of detecting includes locating a crack by reference to the particular wires that have failed in each of the two sets.

32. The method as set forth in claim 28, wherein:
the electrical conductor means is woven into a barrier layer comprising a mat of glass-fibre materials and the step of detecting including detecting a break in wires occurring with a break in the barrier layer.

* * * * *